Jan. 21, 1969    M. H. DETWEILER    3,422,877
FLUSH DECK HATCH COVER ASSEMBLY AND MOVABLE
PIVOT MOUNT THEREFOR
Filed July 27, 1967    Sheet 5 of 5
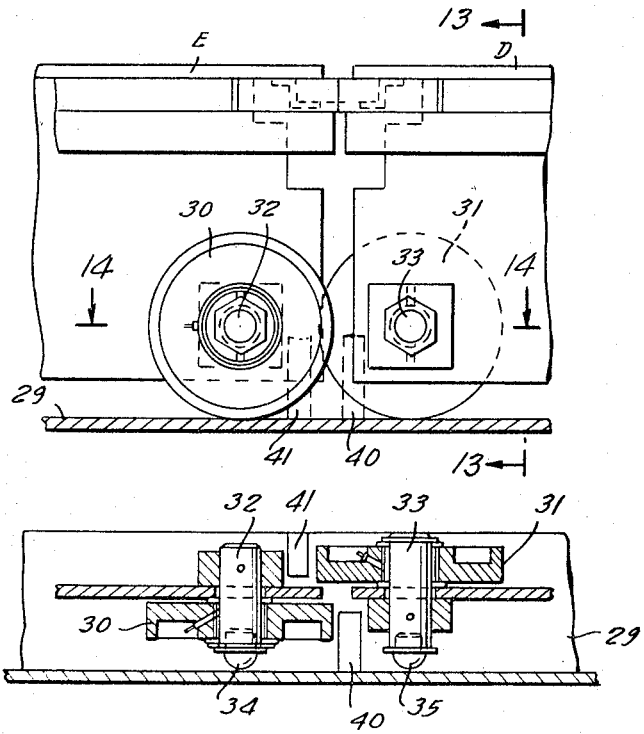
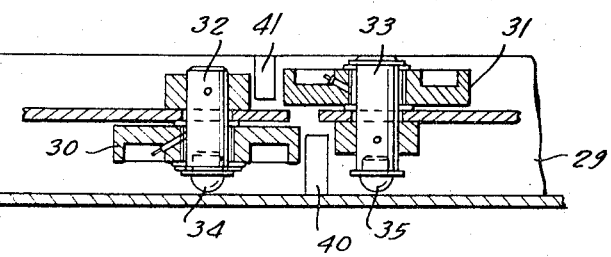
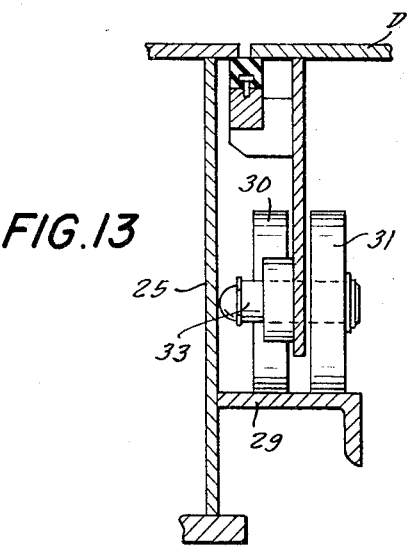
INVENTOR
MEADE H. DETWEILER
BY
ATTORNEY United States Patent Office 3,422,877
Patented Jan. 21, 1969

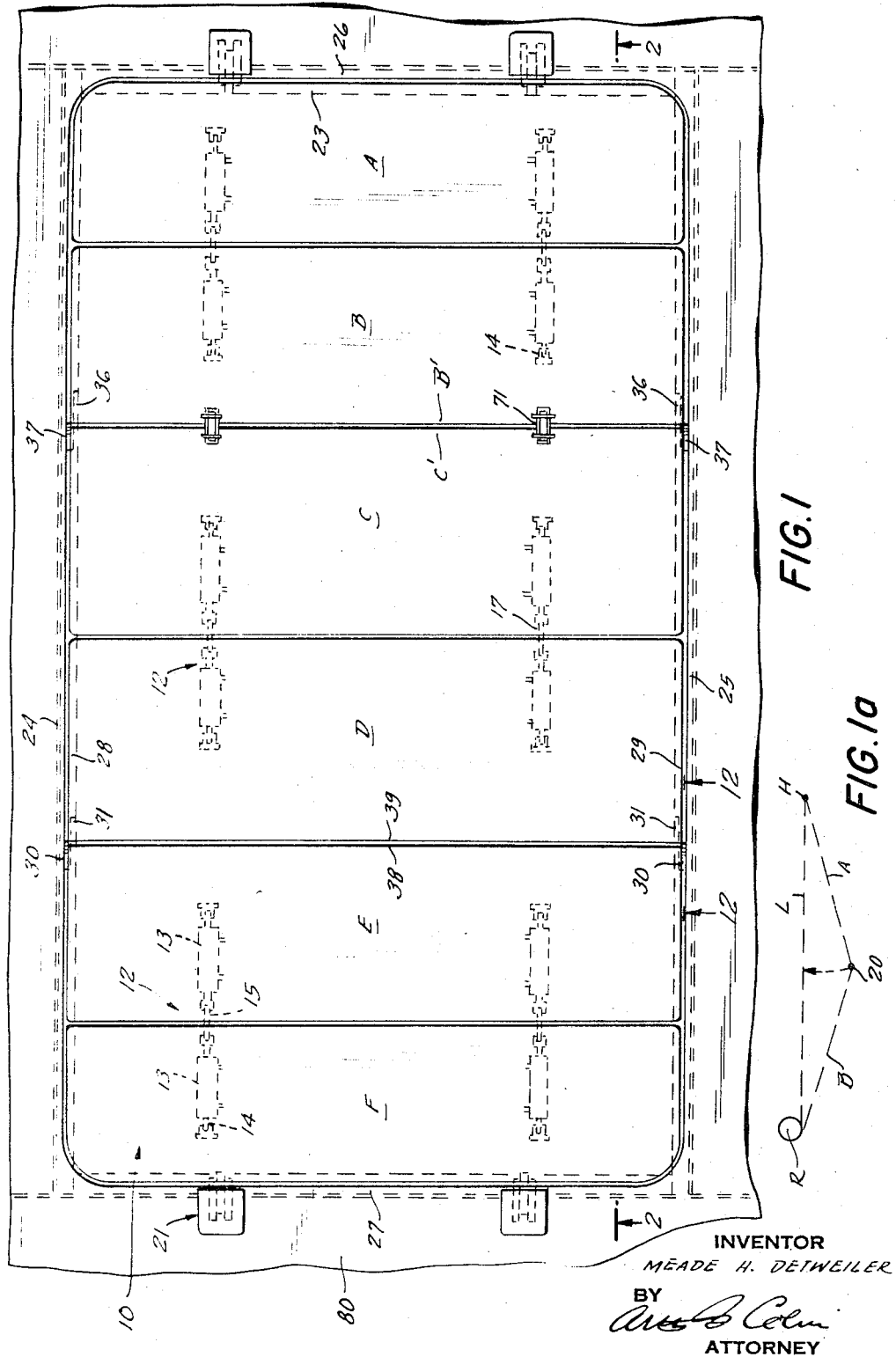

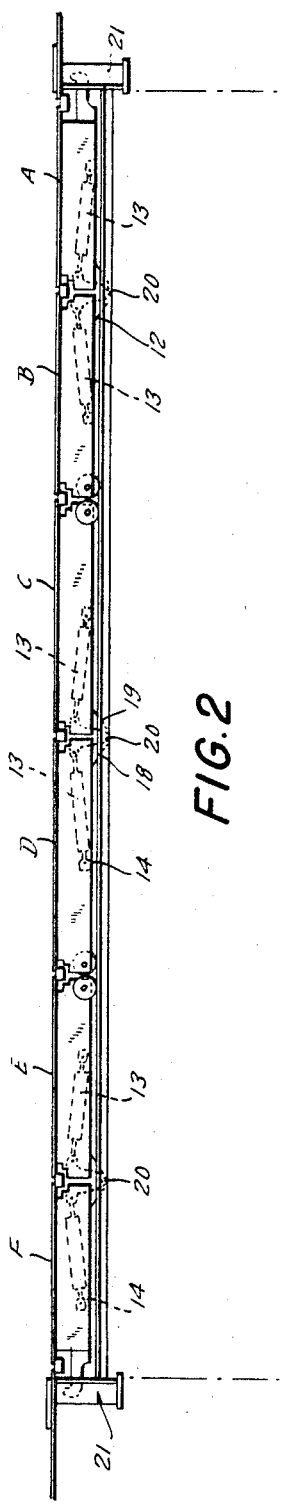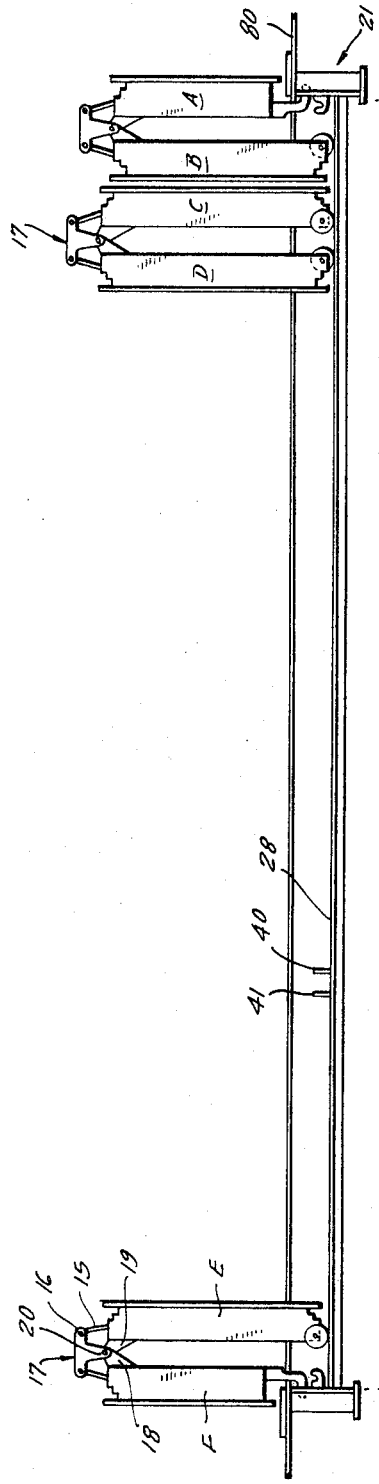

3,422,877
FLUSH DECK HATCH COVER ASSEMBLY AND MOVABLE PIVOT MOUNT THEREFOR
Meade H. Detweiler, Catasauqua, Pa., assignor to Fuller Company, Catasaqua, Pa., a corporation of Delaware
Filed July 27, 1967, Ser. No. 656,505
U.S. Cl. 160—188     8 Claims
Int. Cl. E06b 3/48; B63b 19/12

ABSTRACT OF THE DISCLOSURE

A flush deck hatch cover assembly comprising a plurality of pivotally connected panels including hinge means connecting an edge portion of the outermost panel to the edge of a hatchway in a deck or the like, characterized by first and second, laterally and vertically displaced pivot connections, permitting vertical and horizontal shifting movement of the hinge components, initial lateral movement of the hinge components accompanying the initial folding action of the hatch panels, serving, by reason of the hinge structure, to lift the edge of the hinged hatch panel to a level above the deck about a first pivot connection, subsequent folding of said panels serving to transfer the pivot connection to a second, laterally displaced, higher pivot connection, the continued folding being effected about a pivot axis defined by said second connection.

BACKGROUND OF THE INVENTION

Field of the invention

This invention relates to the art of hatch covers, and more particularly to a multiple panel hatch cover assembly comprising a plurality of pivotally connected panels of the type shown in U.S. Patent No. 3,043,257, which, when closed, will be flush with the level of the deck through which the hatchway extends.

Description of prior art

Multiple panel hatch covers, and particularly marine hatch covers, may comprise a plurality of generally rectangular panels mounted on a coaming extending above the deck level around the periphery of the hatchway, with the panels being pivotally connected to each other for folding movement between open and closed position. It has been found that such arrangement interferes with the free movement of personnel and cargo shifting equipment across the deck.

Where, to overcome such difficulties a flush deck hatch structure is provided, i.e., a structure in which the upper surfaces of the hatch panels are, in the hatch closed position, coplanar with the deck surrounding the hatch and the pivotally connected panels have one edge adjacent the end of the hatchway hinged thereto on a fixed hinge, certain problems have arisen.

Thus, where, due to the physical geometry of the assembly, initial pivotal movement of the panels cause extension thereof away from the fixed hinge mount to the deck, the free edge of the panel will abut against the opposed end of the hatchway or the edge of an adjacent panel, with resultant buckling and jamming unless a wide gap is provided.

It will be understood, however, that if unduly great spaces are permitted, there is a danger that the wheels or other components of loading equipment will become jammed in such gap and that due to the difficulty of forming a seal, undue amounts of debris or the like will collect in this area and leakage may also occur into the hatchway.

SUMMARY OF THE INVENTION

This invention relates to a multi-panel, flush deck hatch installation and supportive hinge mechanism therefor, which is predicated upon the provision of hinge components for connecting the endmost panel of an interconnected series to the end of a hatchway in the deck, such hinge incorporating a two pviot, articulated relationship in conjunction with a lifting cam surface.

The hinge linkage incorporates a first pivot and seat connection which, upon folding of the panels from the coplanar or hatch sealing position toward the booked or hatchway access providing condition, cams the edge of the endmost hatch panel adjacent the deck, to a level above the deck level. A second, laterally disposed and higher pivot connection is provided, which connection supplants the first mentioned connection at an intermediate stage of the hatch folding operation and forms a pivot seat for continued folding stages of the panels.

By this means there is provided an assembly in which lateral movement of the panels is minimized and hence the gap between adjacent panels or the edge of a panel remote from the hinge connection and the edge of the hatchway, may also be minimized.

Further, and particularly advantageously, the support units for mounting the panel may be readily assembled to the panels by welding or the like, with an absolute minimum of modification of the deck structure.

Further, the mounting of the elements is noncritical as contrasted with structures heretofore known, permitting mounting by less skilled operators and effecting reductions in installation costs.

There is no substantial likelihood of jamming of the panel assembly, even after frequent operating cycles of the panels.

Accordingly, it is an object of the invention to provide an improved multiple panel, flush deck hatch cover assembly.

A further object of the invention is to provide, for combination with a hatch assembly of the type described, an improved hinge link assembly.

A further object of the invention is to provide a device of the class described wherein installation is simplified and maintenance may be readily effected.

In the accompanying drawings in which is shown one of various possible embodiments of the several features of the invention, FIG. 1 is a plan view of a flush deck hatch installation in accordance with the invention;

FIG. 1a is a diagrammatic view illustrating the operation of the assembly;

FIG. 2 is a sectional view taken along line 2—2 of FIG. 1;

FIG. 3 is a sectional view similar to FIG. 2 in the open position of the hatch;

FIG. 12 is a sectional view taken along line 12—12 of FIG. 1;

FIG. 13 is a vertical sectional view taken along line 13—13 of FIG. 12; and

FIG. 14 is a sectional view taken along line 14—14 of FIG. 12.

Figure 4:
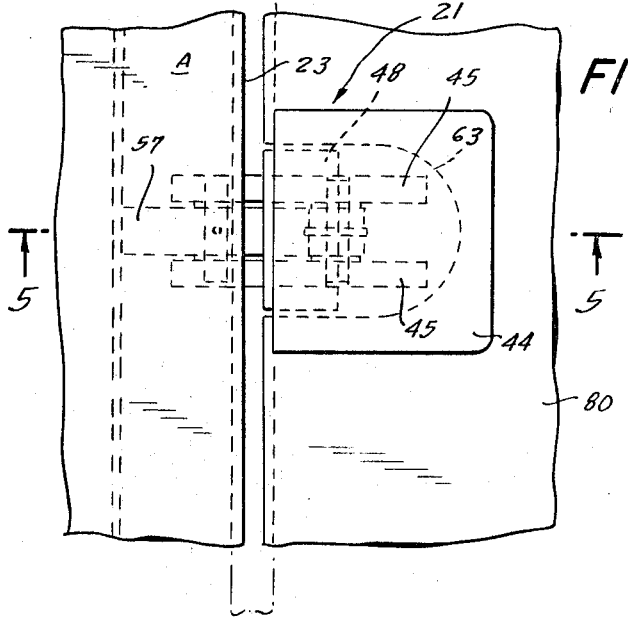
FIG. 4 is an enlarged fragmentary plan view of a typical hinge installation.
Figure 6:
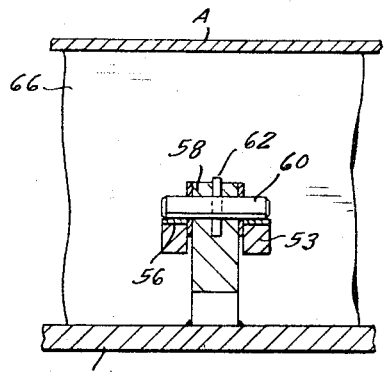
FIG. 6 is a sectional view taken along line 6—6 of FIG. 5.

In accordance with the invention, there is shown in FIG. 1 a marine hatch installation of the flush deck type comprising six panel members A to F, defining together a hatch cover 10. The panels A to F are divided into two sets, A–B–C–D which fold to the right, as viewed in FIG. 1, and E–F which fold to the left, as viewed in said figure.

As shown in FIG. 3, the panels, in the booked or hatch open condition, are stacked with four of the panels, A–D, disposed at the right hand side of the hatchway, and two panels, E–F, at the left hand side of said hatchway. The panels are folded by means of hydraulic hatch actuators 12, of the type shown in Patent No. 2,946,304.

As best seen in FIGS. 2, 3 the actuator comprises two opposed hydraulic cylinders 13 pivotally connected at one end, 14, to a transversely extending cross brace of the hatch panel. The piston rod 15 of each of the actuators is pivotally connected at 16 to one side of a T hinge plate 17. Each adjacent pair of hatch panels of each set, for instance E and F, include generally downwardly directed links 18, 19, the links 18, 19 being pivotally connected to each other and to a pivot point 20 at the base of the T hinge 17.

From the foregoing, it will be readily understood that when hydraulic pressure is admitted to extend the pistons 15, from the opposed cylinders 13, the hatch panels will fold progressively from the coplanar position shown in FIG. 2 to the side by side position shown in FIG. 3.

The hatchway is defined by side or deck beams 24, 25 and end beams 26, 27. As best seen from FIGS. 1 and 13, the deck beams 24, 25 include inwardly directed horizontally disposed trackways 28, 29 which form supports for the panels. The lead panels E and D, FIGS. 1 and 12, carry rollers 30, 31 mounted on stud shafts 32, 33, respectively, it being understood that a pair of rollers 30, 30 is mounted at opposite sides of the panel E and a pair of rollers 31, 31 is mounted at opposite sides of the panel D.

Optionally, but preferably, the stud shafts 32, 33 are provided with lubricated buffer members 34, 35, respectively, preferably of silicon bronze, which may coact with the deck beams 24, 25 in the course of translatory movement of the panels, to guide the panels against skewed movement in the course of folding and unfolding. The buffer may be solid as shown or may comprise a ball and socket, for example. It will be understood that comparable sets of rollers 36, 36; 37, 37 are disposed at the junction of panels B and C to facilitate the translatory movement of the panels in the course of folding and unfolding.

Since the hinge structures 21 linking the end panels to the deck structure form the heart of the present invention, and the hinge structures are identical for both sets of panels, description of a single one of such structure will suffice for an understanding of the present invention.

The structure of the hinges may best be appreciated by reference to FIGS. 4 to 11. The hinge includes two separable components, namely, trunnion seat carrier members 42, 43 defining the two links of the hinge, one of said members 42 being carried by the deck structure 80 and the other member 43 being carried by the end panel A.

The member 42 comprises a mounting plate 44 of heavy reinforcing material, to the undersurface of which is affixed, as by welding, a pair of spaced side plates 45, 45. The side plates 45, 45 include upstanding rear leg portions 46 welded to the underface of the mounting plate 44, and forwardly directed legs 47 welded to a brace plate 48, the plate 48, in turn, being welded to the undersurface of the mounting plate 44.

The legs 47, 46 define therebetween a clearance space 49. The lower edge of the clearance space includes an upwardly inclined cam surface portion 51 defining, at the lowermost and inner extremity of the cam surface, an arcuate trunnion seat 52.

The walls 45, 45 include forwardly or inwardly directed extension flanges 53 (FIG. 10), the flanges defining hook-like projections 54 including inclined ramps or cams 55 leading to lower trunnion seats 56. It will be observed that the vertical slope components of the cam surfaces 55 are steeper than those of the surfaces 51 leading to the upper trunnion seat 52. Thus, it will be seen that the side walls 45, 45 define lower and upper trunnion seats 56, 52, respectively, including cam surfaces 55, 51, respectively, leading downwardly to the associated seats, the slope cam surfaces of lower cams 55 being steeper than that of the upper cam surfaces 51. The seats 52, 56 are seen to be both laterally and vertically displaced, and each of the seats provides a clearance area directly thereabove.

The member 43 carried by the hatch panel A includes a plate 57 having an extension arm 58. The plate 57 carries upper and lower trunnions 59, 60, respectively, protruding beyond both sides of the plate, the trunnions being spaced apart both vertically and laterally to correspond with the spacing of the seats 52, 56.

The hinge links 42, 43 are connected together by passing the extension arm 58 of the trunnion link 43 between the spaced plates 45 and thereafter positioning the trunnions 59, 60 through the appropriate spaced apertures 59', 60', formed in the plate 57, and arm 58, locking pins 61, 62 being employed to secure the trunnions to the trunnion link 43. Installation of the hinge to the panels is readily effected, with a minimum of alteration of the deck or hatchway structure, by the simple expedient of cutting an access aperture 63 in the deck 80 (FIG. 4), in the area facing the side edge 23 of the end panel A. The hinge structure is simply dropped through the opening until the undersurface of the mounting plate 44 is flush against the deck, the brace plate 48, in such position (FIG. 5), lying in coplanar alignment with the deck 80.

Figure 5:
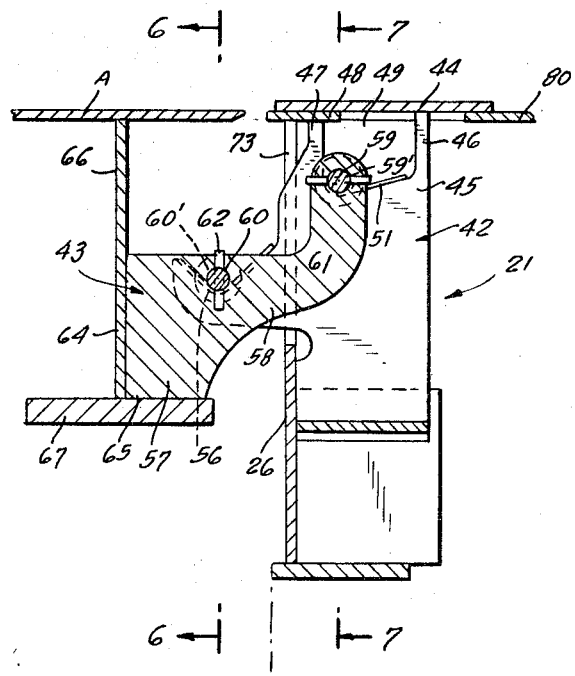
FIG. 5 is a sectional view taken along line 5—5 of FIG. 4.
Figure 7:
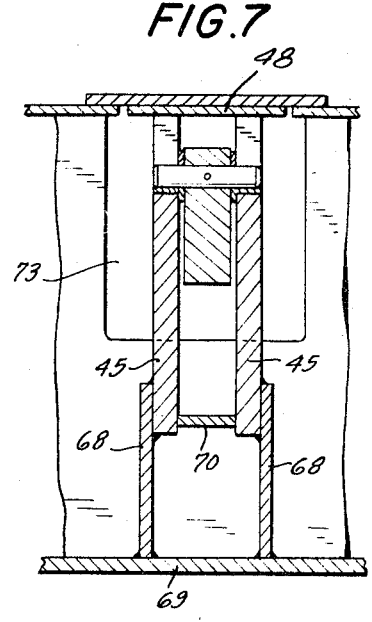
FIG. 7 is a sectional view taken along line 7—7 of FIG. 5.

The hinge assembly 21 is manoeuvered within the clearance provided by the aperture 63 until the end and base walls 64, 65 of the trunnion link 43 are disposed against the hatch panel skirt 66 and the upper surface of panel cross brace 67 (FIG. 5). With the hinge thus aligned, the abutting portion of wall 64 is welded to the skirt 66 and the base wall 65 to the upper surface of the cross brace 67. Thereafter, the mounting plate 44 may be welded to the deck 80.

Optionally and preferably, additional reinforcement for the link member 42 is provided by upstanding flanges 68, 68 (FIG. 7), welded at their lower ends to beam 69 carried by end beam 26 and at their upper ends to the sides of the plates 45. A cross brace 70, welded between the lower ends of the plate 45, strengthens and reinforces these units.

Where the hatch cover incorporates multiples of two panels, such a structure being illustrated in the series of the set of panels represented by A–B–C–D, the intermediate edges C', B' which will, in the folded position, lie adjacent the track, are interconnected by midjoint hinges 71, 71 to permit relative articulation between panels B and C.

It is to be noted that a primary complication in the provision of pivotally connected hatch panels of the type described lies in the fact that the initial extension of the piston rods 15 of the actuators is, by reason of the geometry of the hinge arrangement, accompanied by a longitudinal expansion of the panels.

Thus, referring to FIG. 1a, if the panel A is pivoted to the deck by the fixed hinge H, the initial upward movement of the panels A and B will cause the hinge point 20 to rise in an arcuate path away from the fixed hinge H. This path of movement of the hinge point 20 will cause the panel B to be moved to the left. The same action would occur with respect to panels C and D which would also move to the left and panels E and F which would move to the right.

As a result, the adjacent edges of panels D and E would move toward each other and unless such movement was prevented or a large gap was provided, the panels would buckle.

In accordance with the present invention, the expansion is accommodated by the novel hinge structures 21 which accommodates outward movement of the panels A and F toward the ends of the hatch opening and minimizes movement in a horizontal plane.

The operation of the hinge, and particularly the means whereby the expansion inherent in the initial folding movements of the panels is accommodated, will be best understood from a comparison of FIGS. 8 to 11.

Figure 8:
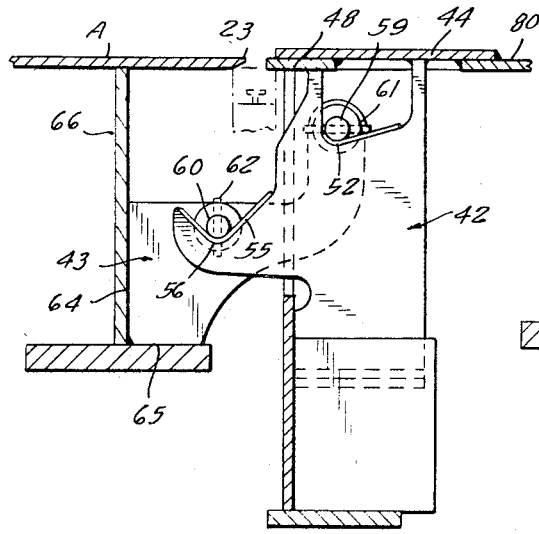
FIGS. 8 to 11 are sequential vertical sectional views showing the position of the parts in the course of movement from the closed hatch position of FIG. 8 to the open hatch position shown in FIG. 11.

In FIG. 8, panel A is shown in the hatch closed and flush relation with the deck 80. With the admission of hydraulic fluid to the actuators 12, and initial folding movement of panels A, B; C, D and E, F, the edges 38, 39 of panels D, E would tend to move toward each other. Abutments 40, 41 which may be disposed on or adjacent the track members 28, 29, positively block such inward movement of the sets of panels. Thus, the expansion is directed outwardly and accommodated by the hinges 21.

Thus, starting from the position of FIG. 8, there will be an initial movement of the trunnion link 43 to the right when the panels first begin to articulate. Whereas the trunnions 59, 60 initially rested in their seats 52, 56, respectively, the initial rightward movement of the panel will cause the lower trunnion 60 to engage against the steep cam surface 55 and cam the edge 23 of the hatch cover upwardly to a level above the level of the deck 80. In the course of this movement, the upper trunnion 59 will be shifted clear of the upper cam surface 51.

Figure 9:
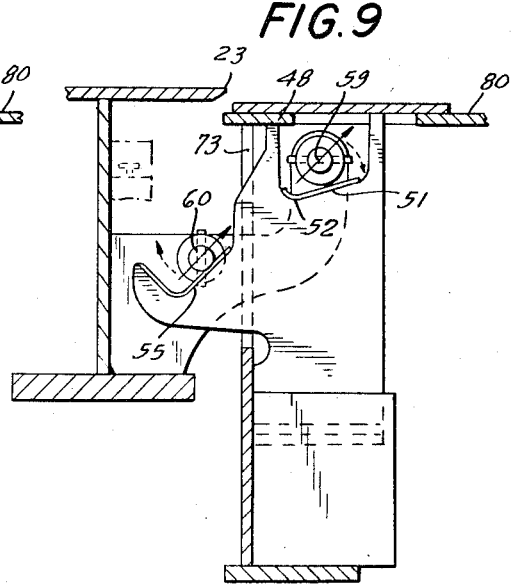

In FIG. 9 there is shown the position of the parts after the initial rightward movement of the hatch cover. Continued extension of the actuators 12 with resulting folding of the panels and extension thereof will cause continued upward movement of trunnion 60 along cam surface 55 as well as arcuate movement of trunnion 59 until trunnion 59 is lowered sufficiently to abut against the upper end of cam surface 51 as shown by the broken lines in FIG. 9.

Such abutment of trunnion 59 against cam surface 51 is designed to occur at approximately the same time that the hinge point 20 between panels A and B, for example, is in the plane of the line L between roller R and hinge point H shown diagrammatically in FIG. 1a. Thus, at this point, the path of hinge point 20 will now be to the right so that no further expansions of the panels will occur.

Figure 10:
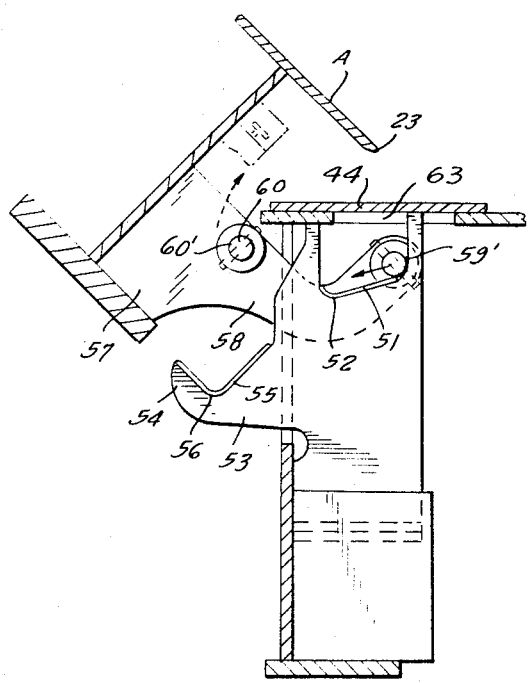

When trunnion 59 engages cam surface 51, the hinge point will automatically shift from the lower cam surface 55 to the upper cam surface 51, as shown in FIG. 10. Thereupon, with further folding action, the trunnion 59 will slide down the cam surface 51 to the seat 52 for completion of the pivotal movement, as shown in FIG. 11.

It will be observed from comparing FIG. 9 with FIG. 8, that in FIG. 9 the upper edge 23 of the hatch cover has been slightly lifted above the deck 80 and that subsequent pivoting movement effected in the course of the booking of the hatch panels will pivot the edge 23 clear of the deck to permit folding of the panels without interference between the edge 23 and the deck structure.

Figure 11:
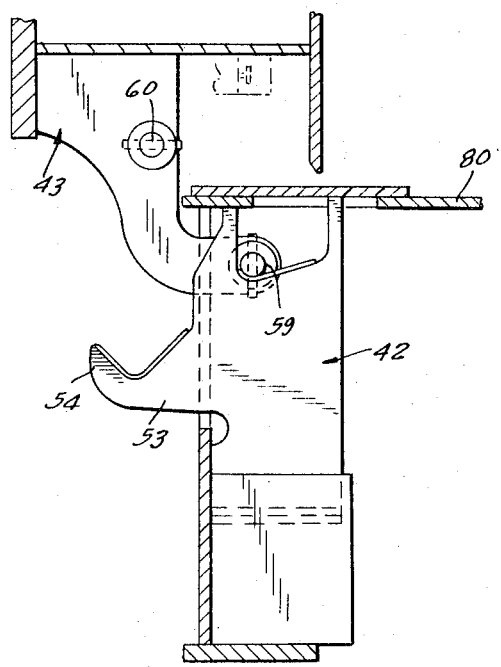

From the foregoing, it will be observed that the sequence of movement from the hatch sealing position of FIG. 8 to the hatch open position of FIG. 11 takes place about pivot axes which are sequentially shifted and raised, and that the final pivotal movements of the hatch panel take place about a pivot axis defined by the upper trunnion seat 52. By this means, the initial expansion movement of the panels is absorbed in the minimum of horizontal distance, and it is possible to install the hatch panels with a minimum of modification of the deck structure surrounding the hatchway. Thus, a minimum of clearance need be provided between the adjacent edges of the hatchway and the hatch panel, without interference between the named parts in the course of folding, since the necessary clearance is provided by the lifting effect previously referred to.

A further advantage inherent in the use of twin, laterally and vertically offset trunnions and trunnion seats lies in the great structural strength provided in the use of twin seats which, in the closed position of the hatch, provide double support for the end of the hatch panel.

Installation of the hinge structure is greatly simplified by the provision of the hinge unit of the invention which may merely be dropped through a clearance aperture formed in the deck of the ship, it being understood that the sole modification to the ship required for installation of the panels is the formation of the aperture 63 in the deck and formation of a clearanceway or slot 73 in the skirt 26 of the deck to provide space for the articulation of the link components.

As will be readily understood by the skilled worker in the art, the adjacent edges of the panels and hatchway and the abutting panel edges may be provided with gasket means of any desired sort to make the hatch seaworthy and protect the contents of the hold.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A flush deck hatch installation for a hatchway in the deck of a ship, said hatchway including side and end walls, comprising a pair of panels hinged together, actuator means for articulating said panels between side-by-side open hatch position and end-to-end coplanar, closed hatch position, the upper surfaces of said panels being substantially level with the deck in said closed position, hinge means disposed beneath the level of said deck, connecting an edge of one of said panels to an end wall of said hatchway, said hinge means including first and second horizontally and vertically relatively movable links secured, respectively, to the end wall of said hatchway and said edge of said panel, upper and lower trunnion seats on said first link, said seats being laterally spaced apart, with said lower seat spaced further from said end wall than said upper seat, first and second cam surfaces inclined upwardly from said upper and lower seats, respectively, toward said end wall, the inclination of said second surface being steeper than that of said first cam surface, and first and second trunnion members on said second link, said trunnion members being horizontally and vertically offset to lie on said first and second seats, respectively, in the closed position of the hatch.

2. A device in accordance with claim 1 wherein said actuator means is effective to expand the combined length of said panels during the initial stages of folding said panels from closed to said open position.

3. A below deck hinge for a flush mounted hatch assembly including pivoted panels shiftable between booked hatch-open and coplanar hatch-closed positions, comprising a pair of links connected together for horizontal and vertical relative movement, laterally and vertically spaced apart upper and lower trunnion seats on one of said links, said seats providing open clearance areas thereabove, a pair of trunnion members on the other said link, said trunnion members being laterally and vertically spaced to coincide with the spacing of, and being disposed on said upper and lower trunnion seats, and first and second cam guide surfaces on said one link adjacent and leading toward said upper and lower seats respectively, the inclination of said second cam surface exceeding the inclination of said first cam surface.

4. For use in hingedly connecting the end panel of a folding multi-panel hatch installation to a ship structure, a hinge device including a fixed and a movable link connected for horizontal and vertical relative movement, between aligned hatch-closed and pivoted hatch-open positions, upper and lower, horizontally spaced apart pivot connection means on said links, first cam and follower means on said links adjacent said lower connection means for lifting said movable link above the level of said fixed link responsive to lateral movement of said movable link toward said fixed link, and second cam and follower means adjacent said upper connection means for shifting said movable link laterally away from said fixed link responsive to pivotal movement of said movable link with respect to said fixed link.

5. A device in accordance with claim 4 wherein said upper pivotal connection means of said links are cleared from contact with each other responsive to lateral movement of said movable link toward said fixed link, and wherein said lower pivotal connection means are cleared of contact with each other responsive to pivotal movement of said movable link with respect to said fixed link.

6. A flush deck hatch installation for a generally rectangular hatchway formed in the deck of a ship, a pair of spaced parallel horizontal trackways disposed at the side edges of said hatchway, a pair of generally rectangular panels pivotally connected to each other, said pair including a lead panel and a hatchway adjacent panel, spaced roller means on said lead panel riding on said trackways, actuator means interposed between said panels for shifting said panels between coplanar hatch closed and folded hatch open positions, limit means connected to said deck in the path of said lead panel for blocking movement of said lead panel away from an end wall of said hatchway and hinge means connecting said hatchway adjacent panel to said end wall of said hatchway, said hinge means including a first link secured to said end wall, upper and lower laterally and vertically offset trunnion seats on said first link, said lower seat being spaced further from said end wall than said upper seat, first and second cam surfaces inclined upwardly from said upper and lower seats respectively toward said end wall, the inclination of said second surface being steeper than that of said first surface, a second link secured to said hatchway adjacent panel, said second link including first and second trunnion members horizontally and vertically spaced apart to lie respectively within said first and second seats of said first hinge in the closed position of said panels, said first link defining clearance spaces above said seats to permit horizontal and vertical relative movement of said links.

7. The combination set forth in claim 6 in which a pair of elongated guides extend parallel and adjacent to said trackways respectively, each of said rollers carrying a buffer member extending axially outward therefrom and adapted to ride against an associated elongated guide to prevent lateral movement of said panels.

8. The combination set forth in claim 7 in which each of said buffers is lubricated.

References Cited

UNITED STATES PATENTS

| | | | |
|---|---|---|---|
| 2,807,461 | 9/1957 | Nes | 160—188 |
| 2,932,272 | 4/1960 | Beas | 160—188 X |
| 3,043,257 | 7/1962 | Appleton et al. | 160—188 X |
| 3,108,631 | 10/1963 | Dahlin | 160—193 |
| 3,215,191 | 11/1965 | Richter et al. | 160—188 X |
| 3,236,288 | 2/1966 | Kersteter | 160—188 X |

PETER M. CAUN, *Primary Examiner.*